Oct. 4, 1960  E. A. O'NEIL ET AL  2,954,946
APPARATUS FOR ASSISTING THE LANDING OF AIRCRAFT
Filed June 28, 1957  3 Sheets-Sheet 1

INVENTORS
EDGAR A. O'NEIL
ALEX F. JACKSON
BY
ATTORNEYS

Oct. 4, 1960 E. A. O'NEIL ET AL 2,954,946
APPARATUS FOR ASSISTING THE LANDING OF AIRCRAFT
Filed June 28, 1957 3 Sheets-Sheet 2

INVENTORS
EDGAR A. O'NEIL
ALEX F. JACKSON
BY
ATTORNEYS

Oct. 4, 1960 E. A. O'NEIL ET AL 2,954,946
APPARATUS FOR ASSISTING THE LANDING OF AIRCRAFT
Filed June 28, 1957 3 Sheets-Sheet 3

INVENTORS
EDGAR A. O'NEIL
ALEX F. JACKSON
BY
ATTORNEYS

United States Patent Office 2,954,946
Patented Oct. 4, 1960

2,954,946

APPARATUS FOR ASSISTING THE LANDING OF AIRCRAFT

Edgar A. O'Neil, Englewood, and Alex F. Jackson, East Orange, N.J., assignors, by mesne assignments, to the United States of America as represented by the Secretary of the Navy Filed June 28, 1957, Ser. No. 668,825

5 Claims. (Cl. 244—110)

The present invention relates to apparatus for assisting the landing of aircraft and more particularly to apparatus for assisting the landing of aircraft which picks up a barrier cable from the flight deck of an aircraft carrier or the like.

Arresting wires which are adapted to engage the tail hook of an aircraft are stretched across the flight decks of either the angled or axial deck aircraft carriers. The ends of the arresting wires are connected to an arresting engine assembly below the flight deck. Should the tail hook fail to engage the arresting wires a sudden danger exists which may be overcome by the pilot touching the aircraft on the flight deck and taking off again. However, there are times when the pilot must land the aircraft on his first attempt and not take off again. Aircraft are generally parked on the forward end of the axial flight decks and failure of the pilot to land his aircraft on his first attempt would cause drastic damage to his aircraft and the parked aircraft. On the angled flight decks, the problem of parked aircraft does not exist; but if the landing aircraft's tail hook has been shot off or is not down, the arresting wires cannot be engaged and therefore the aircraft would not be able to land. Thus, even on the angled flight decks there are instances when an aircraft must land on the flight deck of the carrier on its first attempt.

To remedy this situation a barrier cable is stretched across the flight decks and spaced forwardly from the arresting wires. If the landing aircraft fails to engage the arresting wires in the normal manner, the barrier cable will act as a safety means and stop the aircraft. The ends of the cable are connected to conventional arresting engines for stopping the aircraft within a predetermined distance. When the barrier cable is to be used to stop the landing aircraft, a problem arises as to what apparatus is to be provided on the aircraft for picking up the cable to assist the aircraft in landing.

In the present invention, the apparatus for picking up the barrier cable, in the event the tail hook fails to engage the arresting wires, is mounted on the main wheel struts. By this arrangement, the apparatus picks up the barrier cable and the main wheel struts absorb the initial shock of engaging the barrier cable.

An object of the present invention is the provision of apparatus for assisting the landing of aircraft which picks up a barrier cable from the flight deck of an aircraft carrier.

Another object is to provide apparatus for assisting the landing of aircraft which is easily adaptable to all types of aircraft.

A further object of the invention is the provision of apparatus for assisting the landing of aircraft which is simple, inexpensive, and easily installed.

Still another object is to provide apparatus for assisting the landing of aircraft which picks up a cable from a flight deck and moves it into engagement with the upper portion of the aircraft's main landing wheel struts.

Other objects and many of the attendant advantages of this invention will be readily appreciated as the same becomes better understood by reference to the following detailed description when considered in connected with the accompanying drawings wherein.

Figure 1:
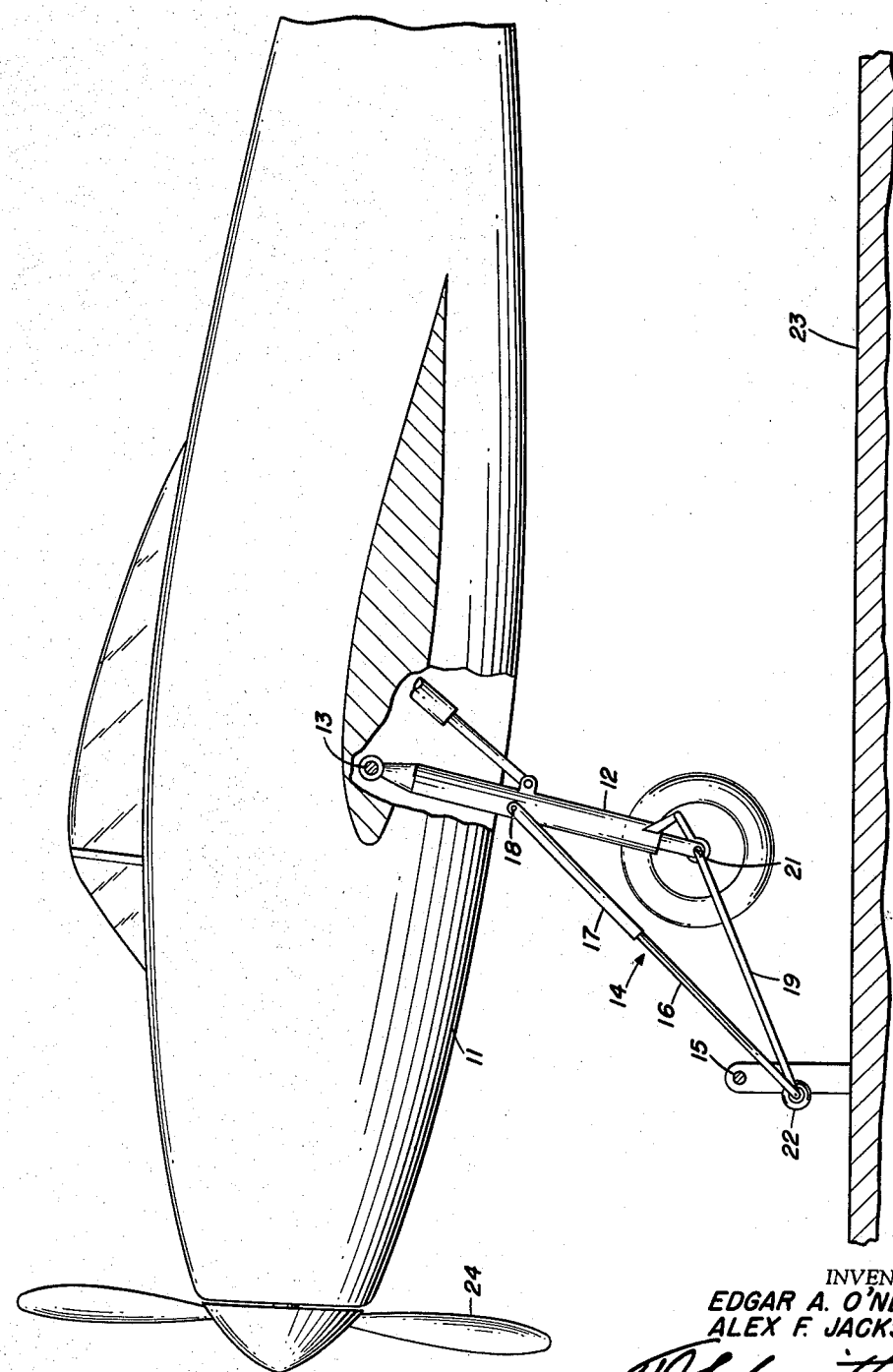
Fig. 1 shows a side elevational view of an aircraft with parts broken away disclosing a preferred embodiment of the invention.

Referring now to the drawings, wherein like reference characters designate like or corresponding parts throughout the several views, there is shown in Fig. 1 an aircraft 11 having a standard type main landing wheel strut 12 pivotally attached thereto at 13. A preferred embodiment of means 14 for picking up a barrier cable 15 comprises telescoping guide bars 16 and 17 pivotally attached at one end near the upper end of the strut 12 at 18, a bar 19 pivotally attached at one end to the lower end of the strut 12 at 21, and a small wheel 22 rotatably mounted on the other ends of bars 16 and 19. The guide bars 16 and 17 extend forwardly and downwardly from the strut 12 to present an inclined surface to the cable 15 when the strut 12 is in the down position as shown in Fig. 1. When the strut 12 is retracted into the belly of the aircraft 11, the bars 16, 17, and 19 are collapsible into a position alongside of the strut 12 and in alignment therewith.

The barrier cable 15 is suspended close to the deck 23 to allow the aircraft's propeller 24 to clear it. When the aircraft 11 is to land on the carrier deck 23 the bars 16, 17, and 19 are lowered into the position shown in Fig. 1. If the aircraft's tail hook (not shown) fails to engage the arresting wires (not shown) the barrier cable 15 will strike the guide bars 16 or 17 and be deflected upward along the inclined surface of the guide bars 16 and 17 until it engages the upper end of the main wheel strut 12. The barrier cable 15 will thus act as a safety device to stop the aircraft after being picked up by the guide bars 16 and 17. If the small wheel 22 strikes the deck, the bar 16 can telescope into the bar 17 to prevent any damage to the bars.

Figure 2:
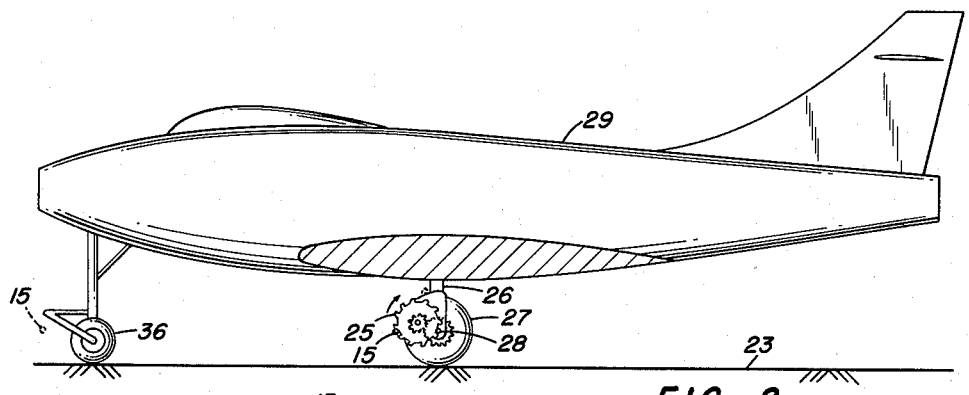
Fig. 2 illustrates a side elevational view of an aircraft having one main wheel strut broken away and showing another embodiment of the invention.
Figure 3:
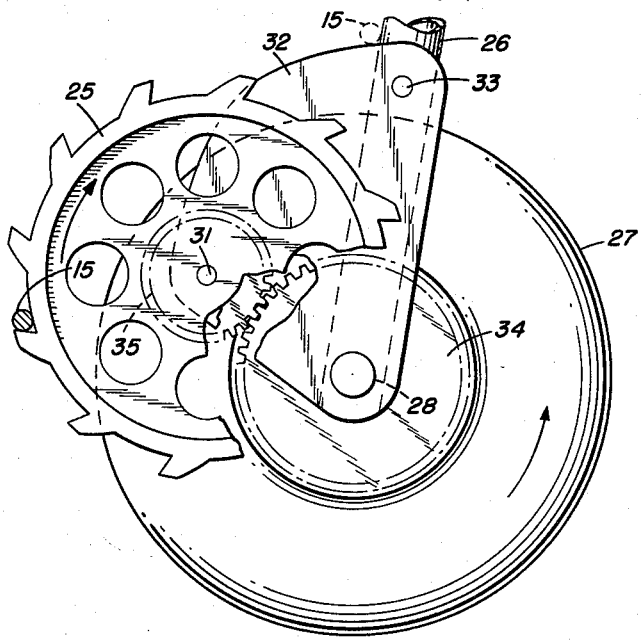
Fig. 3 shows an enlarged view of the embodiment shown in Fig. 2 mounted on a main wheel strut.
Figure 4:
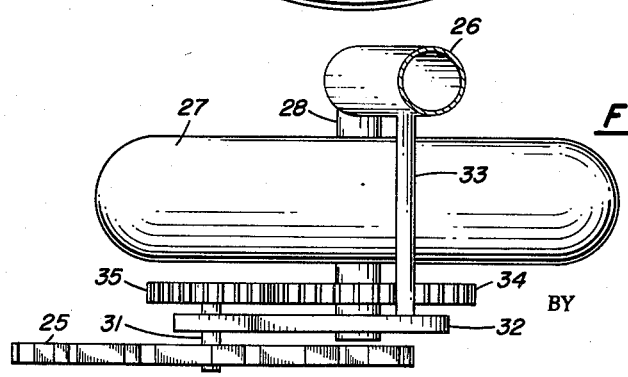
Fig. 4 illustrates a plan view of the embodiment shown in Fig. 3.

Referring to Figs. 2, 3, and 4, a second embodiment of the present invention is shown as a rotating pick up wheel 25 attached to the main wheel strut 26 and geared to the main landing wheel 27 through the main landing wheel shaft 28 of the aircraft 29. As best seen in Figs. 3 and 4, the pick up wheel 25 is fixed to an axle 31 which is supported by a plate 32 that is fixed at its upper end to the strut 26 by a rod 33 and is freely mounted at its lower end on the main wheel shaft 28. A gear 34 is fixed to rotate with the shaft 28 and acts as a driver member. A pinion gear 35 is fixed on the axle 31 and is driven by the gear 34. It is thus seen that when the wheel 27 engages the landing deck 23, the energy of the rotating wheel 27 is transmitted through shaft 28, gear 34, pinion gear 35 and axle 31 to the pick up wheel 25. However, the pick up wheel 25 will rotate in the opposite direction of wheel 27 as shown by the arrows in Fig. 3 and the gear 34, pinion gear 35, and pick up wheel 25 are so designed that the pick up wheel 25 has a higher peripheral speed than that of the main landing wheel 27.

The barrier 15 is located at a higher position than the arresting wires (not shown), relative to deck level, but low enough so that the aircraft's nose wheel 36 will depress it. As the aircraft 29 rolls along the deck 23 during a landing, the rotating pick up wheel 25, with higher peripheral speed than that of the main wheel 27, picks up the cable 15 and carries it upwardly to engage the upper part of the main wheel strut 26. If the cable 15 starts to slip downwardly along the strut 26, the teeth 30 on the rotating pick up wheel 25 will continue to throw the cable 15 back into engagement with the strut 26.

Figure 5:
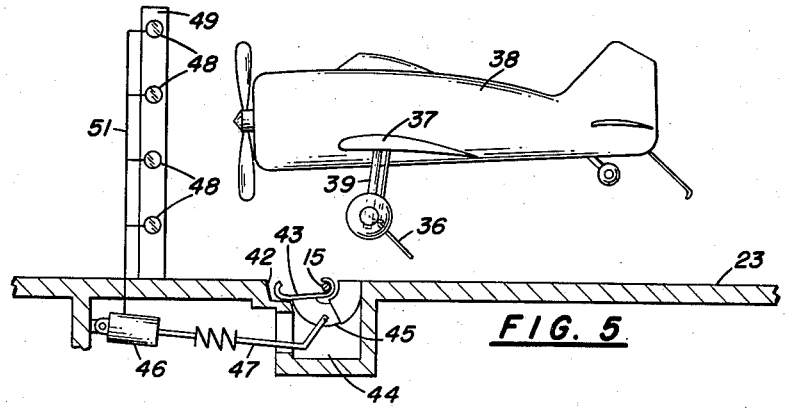
Fig. 5 is a side elevational view, partly in section, of an aircraft landing on a flight deck and having a third embodiment of the present invention mounted thereon.
Figure 6:
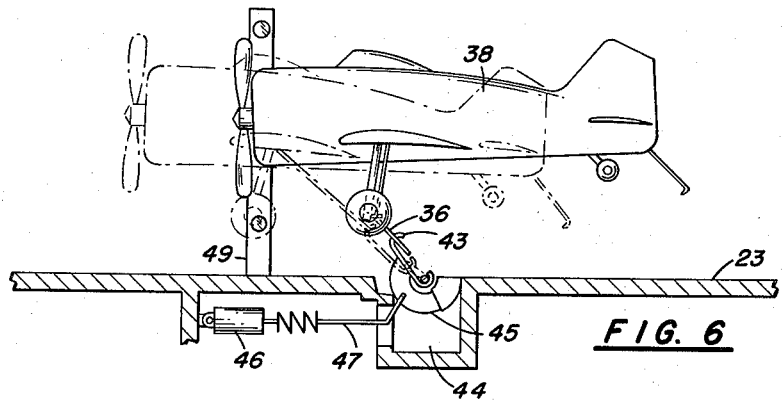
Fig. 6 illustrates a view similar to Fig. 5 with the barrier cable being engaged by the apparatus of the third embodiment.
Figure 7:
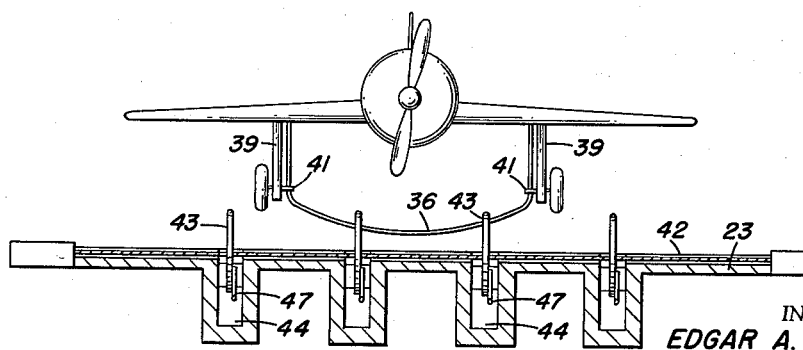
Fig. 7 is a front elevational view of Fig. 6.

The third embodiment of the present invention is shown in Figs. 5, 6, and 7. A pick up cable 36 has its ends fixed to the undersurface of the wings 37 of an aircraft 38 or to the upper part of the struts 39. As best seen in Fig. 7, the ends of the pick up cable 36 are spaced approximately the distance between the main landing wheel struts 39 with the lower portion of the cable 36 hanging in a catenary shape. The cable 36 is breakably secured at points spaced from its ends to the struts 39 by breakable holding links 41.

The barrier cable 15 lies in a protective groove 42 provided in the deck 23. Grab hooks 43 are strung along the cable 15 and lie in longitudinal slots 44 to be flush with the deck surface 23. The hooks 43 rest on links 45 and are movable with links 45 but not fixed thereto. The links 45 are pivotally mounted in the slots 44 to move the hooks 43 between a rest position (Fig. 5) and a catching position (Figs. 6 and 7). Any known means for actuating the links 45 can be used, such as solenoids 46 and armature rods 47 connected to the links 45. The solenoids 46 are energized by pulses received when the beams of light from photo-electric cells 48 mounted on a stanchion 49 are broken by the nose or propeller of the aircraft 38. A suitable circuit 51 is provided to connect the cells 48 with the solenoids 46. When the beams of light from the photo-electric cells 48 are broken, the grab hooks 43 are raised into the catching (solid line) position shown in Fig. 6. The pick up cable 36 engages the upper ends of the hooks 43 and when the aircraft 38 moves forward to the dotted line position shown in Fig. 6, the breakable links 41 break allowing the pick up cable to assume the dotted line position shown. At the same time the hooks 43, which are connected to the barrier cable 15, are pulled off of and away from the links 45. The barrier cable 15 is therefore connected to the pick up cable 36 by means of the hooks 43. Subsequently, the barrier cable 15 functions in its normal manner to stop the aircraft 38. In the third embodiment of the invention, the barrier cable 15 does not directly contact the main wheel struts 39, as in the first two embodiments; however, the ends of the pick up cable 36 are attached to the wing in the area where the struts 39 are fixed to the wings 37. Therefore, the impact of picking up the barrier cable 15 is transmitted, in all three embodiments, to the area where the main wheel struts connect with the undersurface of the aircraft's wing or body. By this arrangement, the aircraft is less likely to pitch forward than if the lower part of the struts were engaged by the barrier cable.

It should be noted that three different types of aircraft have been shown in the three embodiments of the present invention. This is not to be considered as restricting the use of any one embodiment with a particular type of aircraft. Rather it should be understood that the various embodiments are usable with any of the types of aircraft shown and are not limited to use on the type of aircraft they are mounted on.

Obviously many modifications and variations of the present invention are possible in the light of the above teachings. It is therefore to be understood that within the scope of the appended claims the invention may be practiced otherwise than as specifically described.

What is claimed is:

1. In an aircraft having main landing wheels and main landing wheel struts, an apparatus associated with each landing wheel and strut for picking up a barrier means from a runway comprising a pick up wheel rotatably mounted on said strut, and means rotatably connecting said pick up wheel with said main landing wheel for rotating said pick up wheel in the opposite direction of said main landing wheel when the aircraft is landing whereby said pick up wheel will engage the barrier means and move it upwardly into engagement with the upper end of said strut.

2. The combination set forth in claim 1 wherein said pick up wheel has a plurality of spaced teeth on its periphery for engaging the barrier means.

3. The combination set forth in claim 2 in which said teeth are angled in the direction of rotation of said pick up wheel.

4. The combination as set forth in claim 1 wherein the means rotatably connecting said pick up wheel with said main landing wheel comprises gear means.

5. In an aircraft having main landing wheels and main landing wheel struts, an apparatus associated with each landing wheel and strut for picking up a barrier cable comprising a plate fixed at its upper end to an intermediate portion of the strut and at its lower end to the axle of said main landing wheel, said plate having a curved surface projecting forwardly and upwardly of said axle, a pick up whel rotatably connected to a forwardly projecting portion of said plate, said pick up wheel having teeth spaced around its periphery, a small gear fixedly connected to said pick up wheel and a large gear connected to said axle and drivingly associated with said small gear whereby rotation of said landing wheel, axle and large gear will drive said small gear and pick up wheel in an opposite direction so that the teeth on the pick up wheel will pick up the barrier cable and move it upwardly along the curved surface of the plate and into contact with the upper end of said strut.

References Cited in the file of this patent

UNITED STATES PATENTS

| | | |
|---|---|---|
| 1,315,320 | Le Mesurier | Sept. 9, 1919 |
| 2,505,652 | Schweitzer et al. | Apr. 25, 1950 |
| 2,844,340 | Daniels et al. | July 22, 1958 |

FOREIGN PATENTS

| | | |
|---|---|---|
| 740,221 | Germany | Oct. 14, 1943 |